US012548944B2

(12) United States Patent
Duenkel

(10) Patent No.: US 12,548,944 B2
(45) Date of Patent: Feb. 10, 2026

(54) COOLING FLUID GUIDANCE HOUSING AND ELECTRICAL CONNECTOR SYSTEM WITH A COOLING FLUID GUIDANCE HOUSING

(71) Applicant: TE Connectivity Germany GmbH, Bensheim (DE)

(72) Inventor: Dirk Duenkel, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 1064 days.

(21) Appl. No.: 17/516,981

(22) Filed: Nov. 2, 2021

(65) Prior Publication Data

US 2022/0140524 A1 May 5, 2022

(30) Foreign Application Priority Data

Nov. 2, 2020 (DE) ......................... 102020128791.7

(51) Int. Cl.
*H01R 13/533* (2006.01)
*B60L 53/16* (2019.01)
(Continued)

(52) U.S. Cl.
CPC ............ *H01R 13/533* (2013.01); *B60L 53/16* (2019.02); *H01R 24/28* (2013.01); *H01R 43/20* (2013.01)

(58) Field of Classification Search
CPC ...... H01R 13/533; H01R 24/28; H01R 43/20; H05K 7/20254; B60L 58/26
See application file for complete search history.

(56) References Cited

U.S. PATENT DOCUMENTS 8,085,538 B2 * 12/2011 Noshadi ............. H05K 7/20872 361/699
8,926,360 B2 1/2015 Manahan et al.
(Continued)

FOREIGN PATENT DOCUMENTS

CN 106887733 A 6/2017
CN 107444174 A 12/2017
(Continued)

OTHER PUBLICATIONS

Office Action from the Japanese Patent Office dated Dec. 13, 2022, corresponding to Application No. 2021-176011 with English translation, 20 pages.

(Continued)

*Primary Examiner* — Briggitte R. Hammond
(74) *Attorney, Agent, or Firm* — Barley Snyder

(57) ABSTRACT

A cooling fluid guidance housing guides a cooling fluid around an electrical connector system including a connector and a mating connector. The cooling fluid guidance housing includes a first section in which a support element is arranged, a second section in which an inner wall of the cooling fluid guidance housing follows an outer wall of the connector housing at a predefined distance with the connector received in the cooling fluid guidance housing, and a cooling fluid connection. The support element contacts a connector housing of the connector. The inner wall in the second section defines a cooling channel surrounding at least in part the outer wall, and the cooling fluid is introduced into the cooling channel through the cooling fluid connection.

19 Claims, 9 Drawing Sheets

(51) Int. Cl.
*H01R 24/28* (2011.01)
*H01R 43/20* (2006.01)

(56) References Cited

U.S. PATENT DOCUMENTS

| | | | | |
|---|---|---|---|---|
| 9,287,646 | B2 | 3/2016 | Mark | |
| 9,570,730 | B2 * | 2/2017 | Wetzel | H01R 13/506 |
| 11,225,133 | B2 | 1/2022 | Van Seventer | |
| 2010/0047091 | A1 | 2/2010 | Schiffhauer et al. | |
| 2015/0217654 | A1 | 8/2015 | Woo et al. | |
| 2019/0291588 | A1 | 9/2019 | Chou et al. | |
| 2020/0077541 | A1 | 3/2020 | Sharf | |
| 2020/0353830 | A1 | 11/2020 | Duenkel et al. | |

FOREIGN PATENT DOCUMENTS

| | | | |
|---|---|---|---|
| CN | 207116763 | U | 3/2018 |
| CN | 208737932 | U | 4/2019 |
| CN | 209516095 | U | 10/2019 |
| CN | 210212075 | U | 3/2020 |
| CN | 111095742 | A | 5/2020 |
| DE | 202011050446 | U1 | 11/2011 |
| DE | 102015100347 | A1 | 7/2016 |
| DE | 102016012018 | A1 | 4/2017 |
| DE | 102016204895 | A1 | 9/2017 |
| DE | 102019111749 | A1 | 11/2020 |
| EP | 3401955 | A1 | 5/2017 |
| EP | 3611738 | A1 | 2/2020 |
| JP | 49009937 | Y | 3/1974 |
| JP | 2008142221 | A | 6/2008 |
| JP | 2019121476 | A | 7/2019 |
| WO | 2019043311 | A1 | 3/2019 |

OTHER PUBLICATIONS

Chinese Office Action dated Mar. 3, 2025 with English translation, corresponding to Application No. 202111268794.6, 20 pages.

German Office Action, App. No. 10 2020 128 791.7, dated Jul. 19, 2021, 10 pages.

English translation of CN 107444174A, dated Dec. 8, 2017, 5 pages.

English translation of CN 208737932U, dated Apr. 12, 2019, 8 pages.

English translation of JP 008142221A, dated Jun. 26, 2006, 8 pages.

Extended European Search Report, Application No. 21205858.0-1203, Dated: Mar. 21, 2022, 24 pages.

Indian Search Report, Application No. 202144049291, Dated: May 20, 2022, 6 pages.

* cited by examiner

COOLING FLUID GUIDANCE HOUSING AND ELECTRICAL CONNECTOR SYSTEM WITH A COOLING FLUID GUIDANCE HOUSING

CROSS-REFERENCE TO RELATED APPLICATIONS

This application claims the benefit of the filing date under 35 U.S.C. § 119(a)-(d) of German Patent Application No. 102020128791.7, filed on Nov. 2, 2020.

FIELD OF THE INVENTION

The invention relates to a cooling fluid guidance housing for guiding a cooling fluid around an electrical connector system and to an electrical connector system comprising a connector and a mating connector and a cooling fluid guidance housing.

BACKGROUND

In the electrical field (electronics, electrical engineering, electrics, electrical power engineering, etc.) a large number of electrical connector apparatuses or devices, socket, pin and/or hybrid connectors, etc. —hereinafter referred to as (electrical) connectors (also: mating connectors)—are known which serve to transmit electrical currents, voltages, signals, and/or data having a large bandwidth of currents, voltages, frequencies, and/or data rates. In the low, medium, or high voltage and/or current range, and in particular in the vehicle sector, such connectors must ensure a rapid transmission of electrical power, signals, and/or data permanently, repeatedly, and/or after a comparatively long period of inactivity in mechanically stressed, warm, possibly hot, contaminated, humid, and/or chemically aggressive environments. Due to a wide range of applications, a large number of specially designed connectors are known.

Such a connector and possibly its associated (e.g. in the case of a connector apparatus or a connector device) or higher-level (e.g. in the case of a connector device) housing can be attached to an electric line, a cable, a cable harness, etc. —hereinafter referred to as an (electrical) pre-assembled cable-, or on/in an electrical device or apparatus, such as at/in a housing, at/on a lead frame, at/on a printed circuit board, etc., a (power) electrical, electro-optical, or electronic component or a corresponding aggregation, etc. (electrical entity).

If a connector (with/without a housing) is disposed on a cable, a line or a cable harness, respectively, then this is referred to as a floating (plug) connector or a plug, a socket, or a coupling; if it is disposed on/in an electrical, electro-optical, or electronic component, aggregation, etc., then this is referred to as a connector device, such as e.g. a (panel/add-on) connector, a (panel/add-on) plug or a (panel/add-on) socket. Furthermore, a connector on such a device is often referred to as a (connector) receptacle, header socket, pin header, or header. In the context of electrical energy technology (generation, conversion, storage, transportation, and forwarding of high electrical current in electrical grids, with three-phase high-voltage transmission), this is presently referred to as cable fittings due to their comparatively complex configuration.

Such a connector must ensure the flawless transmission of electricity, where corresponding and in part complementary connectors (connector and mating connector) typically comprise locking devices and/or fastening devices for permanent and typically releasable locking and/or fastening the connector on/in the mating connector or vice versa. Furthermore, an electrical connection device for a connector, e.g. having or comprising an actual contact apparatus (terminal; mostly formed materially as one part or integrally, e.g. a contact element etc.) or a contact device (terminal; mostly formed as several parts, two-part, as a single part, materially as one piece or integrally, e.g. a single-part or multi-part (crimp) contact device), must be securely received therein. In the case of a (pre) assembled electrical cable, such a connecting device can be provided as a connector (see above), i.e. without a housing, e.g. in a floating manner.

Efforts are constantly being made to improve electrical connectors and their terminals, in particular to design them more efficiently and to configure and/or manufacture them to be more inexpensive. Increasing hybridization and electrification of a drive train of a vehicle as well as increasing electrification of ancillary units entail, inter alia, thermal loads which can have negative effects, if not addressed. This relates, inter alia, to electrical plug connections in a vehicle. There is an increasing need for cooling, as is known for cable fittings from the field of electrical power engineering.

U.S. Pat. No. 8,926,360 A1 discloses an electrical connection with an active cooling device, where the electrical connection comprises at least one electrical connection composed of a female and a male terminal. The at least one female terminal is optionally surrounded by heat-resistant electrical insulation and is configured in a wall of an electrical device together with a heat sink that conducts heat comparatively well. Furthermore, the female terminal comprises an opening so that heat generated in the female terminal can be dissipated from the female terminal. The heat generated between the female and a male terminal can be transported away from the heat sink and the opening of the female terminal by a fan via ambient air of the electrical connection.

Furthermore, U.S. Pat. No. 9,287,646 B2 discloses an electrical connection in which an electrical connector is connected to an electrical line assembly, such as a cable. Either the electrical connector or the electrical line assembly is there actively cooled by a heat transport medium which flows substantially along the electrical line assembly and through the electrical connector.

However, the known electrical connector systems have the drawback that a coolant flows through the interior of the connector housing, leaving behind impurities, for example, as dirt particles or moisture, which can be deposited on the contact elements of the electrical connector system. This contamination can lead to corrosion and other damage to the contact elements so that the service life of the electrical connector system is reduced.

SUMMARY

A cooling fluid guidance housing guides a cooling fluid around an electrical connector system including a connector and a mating connector. The cooling fluid guidance housing includes a first section in which a support element is arranged, a second section in which an inner wall of the cooling fluid guidance housing follows an outer wall of the connector housing at a predefined distance with the connector received in the cooling fluid guidance housing, and a cooling fluid connection. The support element contacts a connector housing of the connector. The inner wall in the second section defines a cooling channel surrounding at least in part the outer wall, and the cooling fluid is introduced into the cooling channel through the cooling fluid connection.

BRIEF DESCRIPTION OF THE DRAWINGS

The invention will now be described by way of example with reference to the accompanying Figures, of which.

DETAILED DESCRIPTION OF THE EMBODIMENTS

Figure 1:
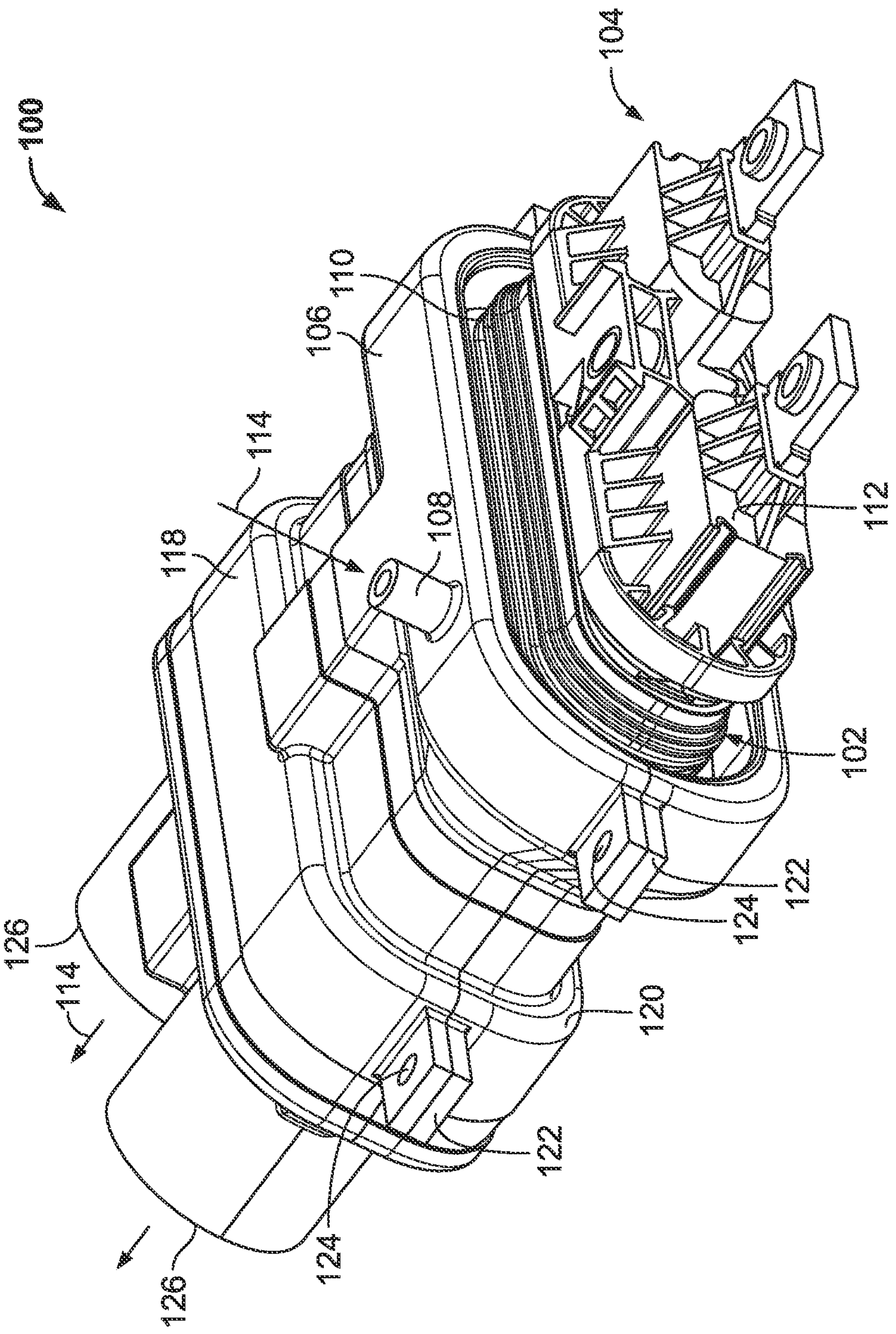
FIG. 1 is a perspective view of an electrical connector system according to an embodiment.

The present invention shall be explained in more detail hereafter with reference to the figures. It is noted that the size ratios in all of the figures and in particular the layer thickness ratios are not necessarily shown true to scale. Furthermore, parts that are not necessary or obstructive for the understanding are not shown. Designations such as connector and mating connector, terminal and mating terminal etc. are to be interpreted synonymously, i.e., possibly interchangeable with each other. Same parts are provided with the same reference numerals and the same component names. Furthermore, some features or combinations of features from the different embodiments shown and described can in themselves represent solutions that are independent, inventive, or according to the invention.

FIG. 1 shows a schematic perspective illustration of two (electrical) connectors 102 and 104 of an electrical connector system 100 according to a first embodiment of the present invention that are plugged into one another. Electrical connector 102 is there configured as a floating socket connector 102, while connector 104, hereinafter referred to as mating connector 104, is presently configured as a connector receptacle 104, a header socket 104, pin header 104, or header 104. Connector 102 can there be part of an assembled electrical cable or an electrical entity.

The mating connector 104, in an embodiment, is configured in particular as a low-voltage mating connector, and in an embodiment as a vehicle mating connector for an electrical system of a vehicle. Electrical voltages of less than 5 kV are regarded as being low voltages. Accordingly, the electrical connector system 100 according to the invention can be configured for low voltages up to voltages of 1 kV to 5 kV with, possibly short-term, currents of up to 500 A.

Electrical connector 102 comprises a connector housing 110 in which at least one electrical contact element is disposed or can be disposed. Electrical mating connector 104 likewise comprises a mating connector housing 112 in which at least one mating electrical contact element is disposed or can be disposed. Connector housing 110 and mating connector housing 112 are each manufactured from insulating material, such as a plastic material. By plugging connector housing 110 into mating connector housing 112, the at least one contact element can be made to conductively contact the at least one mating contact element at a point of contact, so that an electrical current can flow through the electrical connector system 100.

The connector 102, in an embodiment, has no external shielding (electrically conductive layer, protective cover, etc.) on its connector housing 110 for the removal of surface charges, for field distribution, for electromagnetic shielding, etc. This means that the connector housing 110 is in particular electrically non-conductive on the outside. There is no specially configured Faraday cage inside the connector housing 110; apart from applications for shielded coaxial cables or twisted pair cables which exhibit such due to their particular structure, but do not comprise it separately as is the case with cable fittings.

Figure 2:
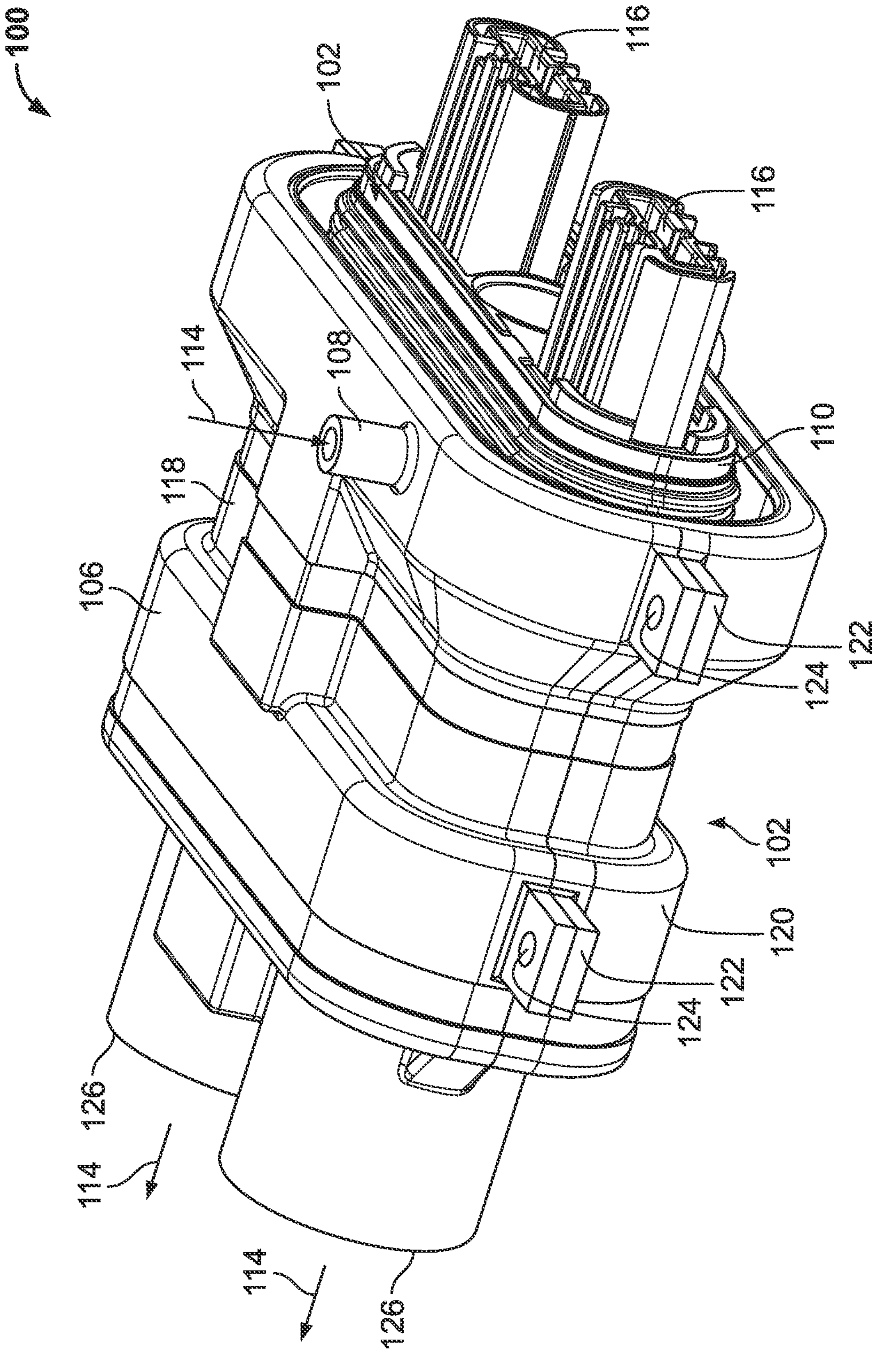
FIG. 2 is another perspective view of the electrical connector system.

FIGS. 1 and 2 show connector 102 surrounded by cooling fluid guidance housing 106. Electrical mating connector 104 is not shown in FIG. 2; this makes contact element receiving chambers 116 visible, through which connector 102 can receive contact elements of mating connector 104.

For cooling electrical connector system 100 by dissipating heat that is generated when current is transported through electrical connector system 100, connector housing 110 is in large part surrounded by a cooling fluid guidance housing 106, as shown in the example in FIGS. 1 and 2. Cooling fluid guidance housing 106 is adapted to guide a cooling fluid 114, for example air, at least in part around the outside of connector housing 110 in order to transport away heat that is generated in the interior of connector housing 110. For this purpose, the cooling fluid guidance housing 106 has a cooling section (second section) in which a cooling channel is defined by an inner wall of the cooling fluid guidance housing 106 and thus forces the cooling fluid 114 introduced into the cooling channel in the cooling section to flow around the outer wall of connector housing 110.

The cooling section is there not necessarily contiguous, but can consist of a plurality of sub-sections, each of which, for example, defines a separate cooling channel.

In an embodiment, the predefined distance in the second section between the inner wall of the cooling fluid guidance housing 106 and the outer wall of the connector housing 110 differs in an inlet section from that of an outlet section of the at least one cooling channel. In this manner, a ruling section or effective volume of the cooling channel for fluid transportation in an inlet section of the cooling channel (e.g. cooling fluid connection or an adjoining downstream section of the cooling channel) can differ from that of an outlet section of the cooling channel (e.g. cooling fluid connection or an opening in the cooling fluid guidance housing 106 that is permeable to gas or an adjoining upstream section of the cooling channel). The ruling section or the effective volume in the inlet section of the cooling channel be then smaller than in a e.g. comparable section disposed downstream thereof in the outlet section of the cooling channel.

The cooling fluid 114 may be air, but it can also be a different gas, such as e.g. nitrogen. Nitrogen can there be e.g. separated from the ambient air by a pressure swing adsorption process (PSA) on board a vehicle. The term gas is of course also to include the term gas mixture (cf. air). Alternatively, the cooling fluid 114 can also be a coolant such as is already present in the cooling circuit of a vehicle. The cooling fluid can be e.g. a cooling fluid that is pre-cooled by an air conditioning unit or a non-pre-cooled cooling fluid that originates from a fan or a compressor and possibly a radiator.

As further shown in FIGS. 1 and 2, the cooling fluid guidance housing 106 has an upper shell 118 and a lower shell 120 which can be connected to one another by fastening elements 122. In this way, simple assembly of cooling fluid guidance housing 106 to the electrical connector system 100 can be ensured. However, a two-part design of the cooling fluid guidance housing 106 is not essential for the present invention. The cooling fluid guidance housing 106 can alternatively also be formed as a single part (or integrally) or to be assembled from a plurality of individual shells.

Fastening elements 122 are shown in FIGS. 1 and 2 by way of example as projections in which hole-shaped recesses 124 can be provided with the aid of which upper shell 118 and lower shell 120 can be fastened to one another using rivets or screws. Alternatively, fastening elements 122 can also have latching devices with the aid of which upper shell 118 and lower shell 120 can be firmly connected to one another. Furthermore, upper shell 118 and lower shell 120 can also be adhesively bonded to one another.

In order to be able to attach cooling fluid guidance housing 106 in a stable manner to electrical connector system 100, the cooling fluid guidance housing 106 has support elements made to contact connector housing 110, mating connector housing 112, or both, and support cooling fluid guidance housing 106.

In order to introduce cooling fluid 114 into cooling fluid guidance housing 106, cooling fluid guidance housing 106 has a cooling fluid connection 108, configured as a connection port 108 in the embodiment shown in FIGS. 1 and 2, so that a hose-like cooling fluid supply line can simply be pushed or plugged onto respective connection port 108 and possibly be further affixed there. It is of course possible to select a different fluid connection instead of a connection port 108, such as, e.g. a connection flange, a connection socket, etc. Gas seals can be used in all embodiments.

In an embodiment, the cooling fluid connection 108 is formed as an integral component of the cooling fluid guidance housing 106. It is then possible to manufacture the cooling fluid guidance housing 106 from a single original piece (e.g. a blank) or from a single original mass (e.g. plastic melt).

Starting out from an inlet opening in the region of cooling fluid connection 108, the cooling fluid introduced can flow along the outer wall of connector housing 110 until the cooling fluid can again leave the interior of cooling fluid guidance housing 106 at an outlet opening 126. As presently shown in FIGS. 1 and 2, the outlet openings 126 can be formed, for example, by openings in the region of the connections of an electrical cable or an electrical device, such as, for example, an electrical unit. Outlet openings 126 can of course also be provided in other regions of cooling fluid guidance housing 106. In particular, the transitions between upper shell 118 and lower shell 120 can be configured to be permeable to fluid so that these transitions offer additional venting options for the heated cooling fluid in the interior of cooling fluid guidance housing 106. The point of the cooling channel permeable to gas can also be formed, for example, by a further cooling fluid connection, by way of which the heated cooling fluid is transported away to a respective heat sink of a cooling circuit. In another embodiment, the transitions between upper shell 118 and lower shell 120 can alternatively also comprise a seal which prevents the cooling fluid from escaping at these transitions.

In an embodiment, cooling fluid guidance housing 106 can comprise at least one additional cooling fluid connection which can serve as an alternative outlet opening in order to enable the heated cooling fluid to be transported away downstream. The cooling fluid guidance housing 106 can have a single, exactly two, or a plurality of cooling fluid connections, so that the cooling channel can be supplied with cooling fluid at several points. Alternatively, however, different cooling fluid connections can each supply one or more of the cooling channels with cooling fluid, so that several cooling channels separated from one another can be defined by the cooling fluid guidance housing 106.

As shall be described below, the inlet opening in the region of cooling fluid connection 108 and outlet opening 126 are connected by a cooling channel which surrounds at least part of the outer wall of connector housing 110. The cooling channel is defined on one side by at least part of the outer wall of connector housing 110 and on the other side at least by the inner wall of cooling fluid guidance housing 106, which together form the cooling channel. A ruling section or an effective volume of the cooling channel for fluid transport can therefore be determined largely by the distance between the outer wall of connector housing 110 and the inner wall of cooling fluid guidance housing 106.

Cooling fluid guidance housing 106 can be manufactured from electrically conductive material, such as, for example, aluminum, for dissipating the heat absorbed by the cooling fluid as efficiently as possible to the environment. Alternatively, cooling fluid guidance housing 106 can also be manufactured from plastic material such as silicone, polytetrafluoroethylene (PTFE), polyethylene (PE), or polypropylene (PP) in order to keep the weight caused by cooling fluid guidance housing 106 as low as possible.

Figure 3:
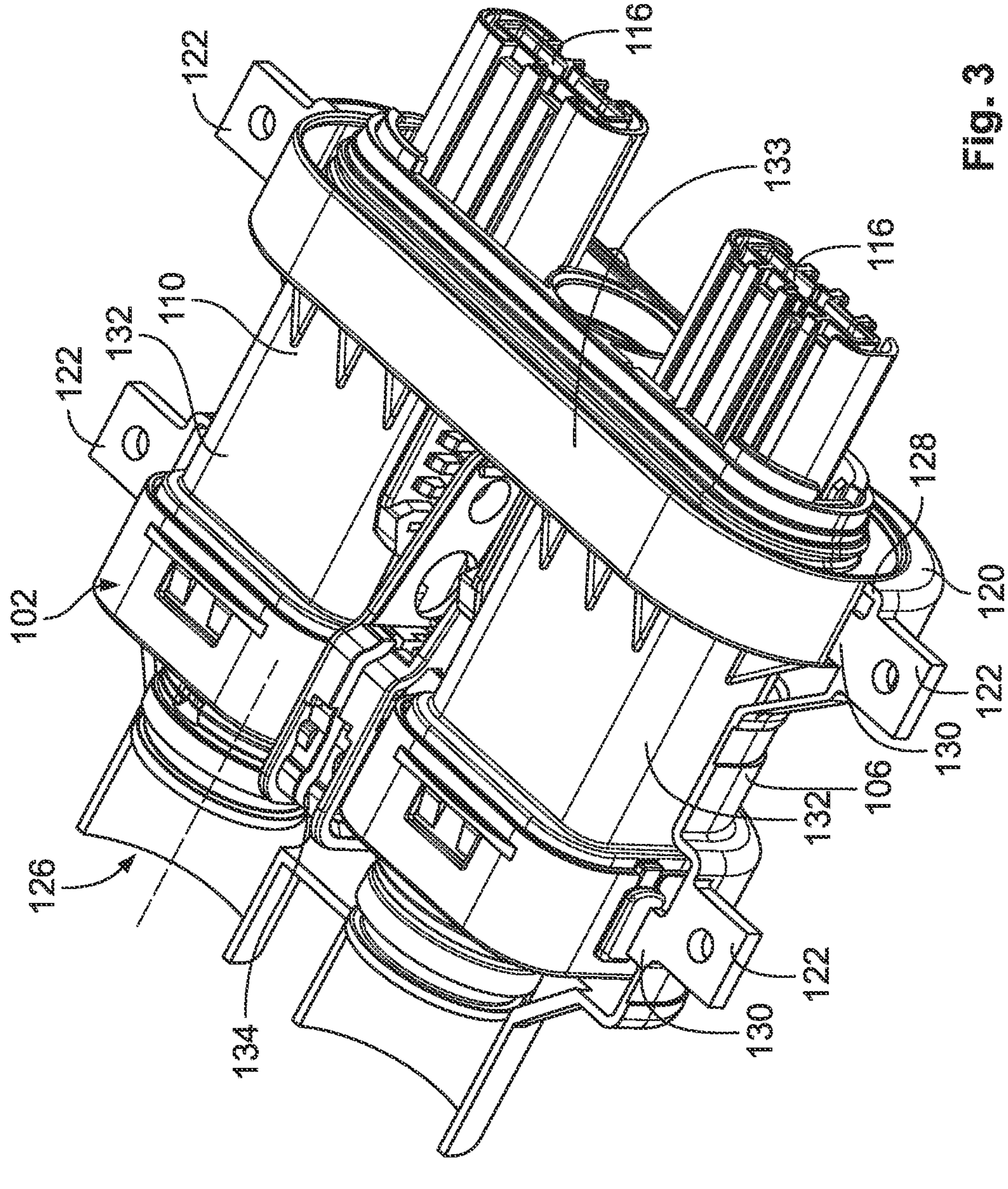
FIG. 3 is another perspective view of the electrical connector system.

FIG. 3 shows a schematic perspective illustration of the electrical connector system according to the first example without mating connector 104 and without upper shell 118 of cooling fluid guidance housing 106. As a result, in particular support elements 130 are visible in FIG. 3 and are made to contact connector housing 110 and thereby stabilize cooling fluid guidance housing 106 on connector housing 110. Support elements 130 are arranged in a first section of cooling fluid guidance housing 106 which serves as a support section. As can be seen in the figure, this support section is not necessarily contiguous, but can comprise a plurality of smaller support sections. Support elements 130 can be attached in the vicinity of fastening elements 122 so that a force transmission path between fastening elements 122 and support elements 130 can be kept short.

As shown in FIG. 3, an outer edge 128 of cooling fluid guidance housing 106 can be made to contact connector housing 110 in order to increase the stability of the attachment of the cooling fluid guidance housing 106. In particular, outer edge 128 of cooling fluid guidance housing 106 can terminate flush with connector housing 110 so that connector housing 110 can be prevented from protruding in this region. It can be prevented by a termination that is as tight as possible between outer edge 128 and connector housing 110 in the direction of contact element receiving chambers 116 that heated cooling fluid can escape from the cooling fluid guidance housing 106 in the direction of a mating connector 104 and heat the latter.

As can be seen in the embodiment shown in FIG. 3, connector housing 110 can have a modular structure, meaning that it can comprise several connector modules 132 that can be plugged together, where at least one contact element is disposed or can be disposed in each of the connector modules 132 that can be plugged together. Each of connector modules 132 can then, for example, be pushed into a holding element 133 and connected to one another with a connecting element 134, such as a clamp. In this case it is possible that only the cooling channels that are associated with an inserted connector module 132 are supplied with cooling fluid, while other cooling channels are closed, for example, by blind plugs or blind flanges. The efficiency of the cooling can thus be further increased, while it is possible at the same time to manufacture standardized cooling fluid guidance housings 106.

In an embodiment, cooling fluid guidance housing 106 can comprise a separate cooling channel for each of connector modules 132. An associated cooling fluid connection 108 can be provided for each of the separate cooling channels so that each of connector modules 132 can be cooled as required by the cooling fluid flowing through the respective separate cooling channel. In addition, cavities which accommodate holding element 133 and connecting elements 134 can be provided in cooling fluid guidance housing 106.

Figure 4:
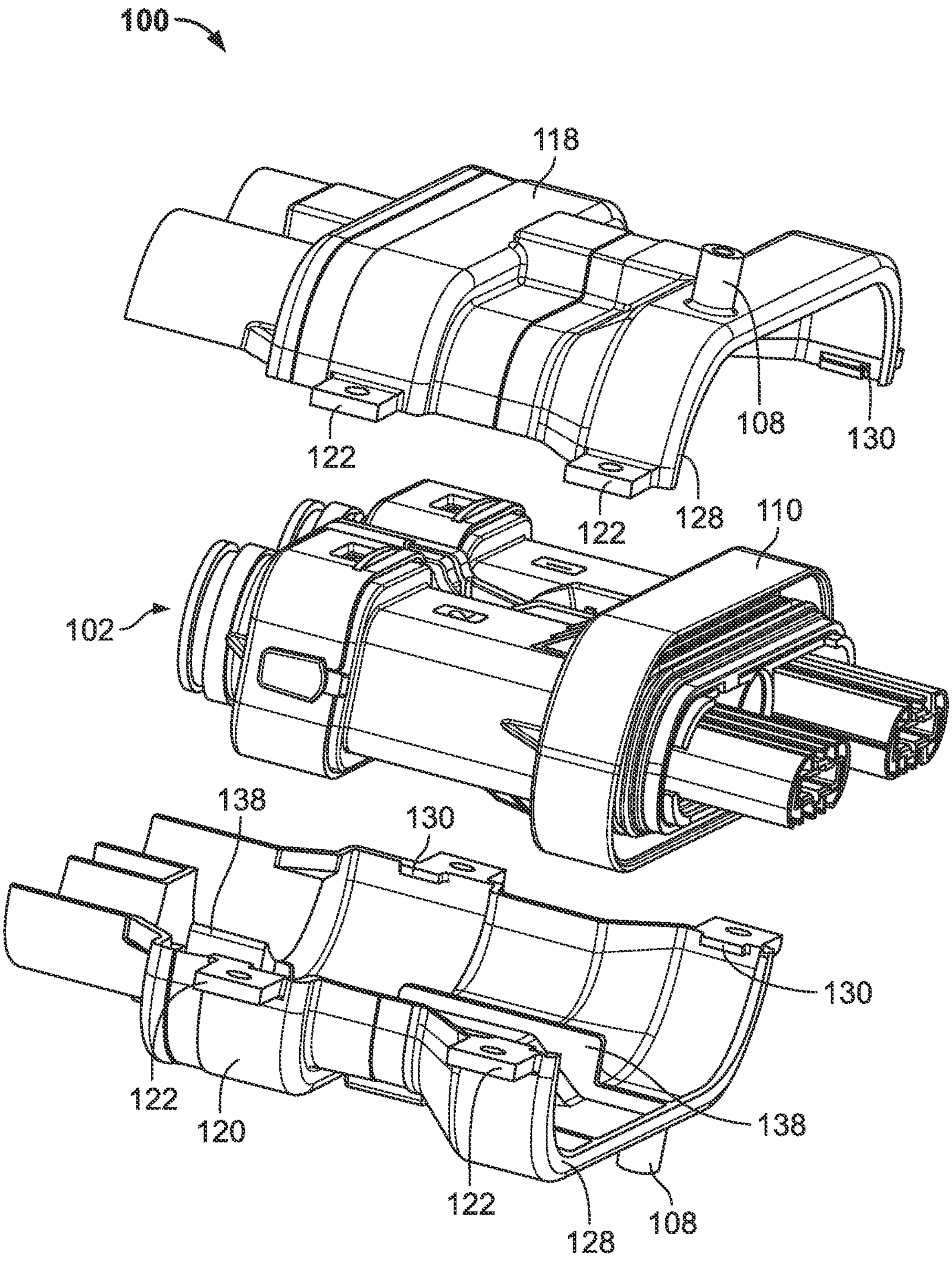
FIG. 4 is an exploded perspective view of the electrical connector system.

FIG. 4 shows a schematic exploded illustration of electrical connector system 100 according to the first example without mating connector 104. As is clear from this view, connector housing 110 can be inserted between upper shell 118 and lower shell 120 for mounting the assembly, where outer edge 128 of cooling fluid guidance housing 106 and support elements 130 are made to contact connector housing 110. Upper shell 118 and lower shell 120 can then be fastened to one another in a closed manner with the aid of fastening elements 122. Cooling fluid guidance housing 106 can then be attached to connector 102 either before or after the closure of electrical connector system 100. The cooling fluid guidance housing 106 can be fixedly attached to the electrical connector 102 with the aid of the support elements 130.

As is also shown in FIG. 4, upper shell 118 and lower shell 120 each comprise a cooling fluid connection 108 which can supply either a common cooling channel or two separate cooling channels within the cooling fluid guidance housing 106. Alternatively, one of two cooling fluid connections 108 can serve as an upstream cooling fluid inlet, while the other of cooling fluid connections 108 serves as a downstream cooling fluid outlet. In this way, the heated cooling fluid can be transported away particularly easily to a corresponding heat sink of a cooling circuit. The cooling fluid, which has cooled down again, can subsequently be fed back into the interior of the cooling fluid guidance housing 106.

Figure 5:
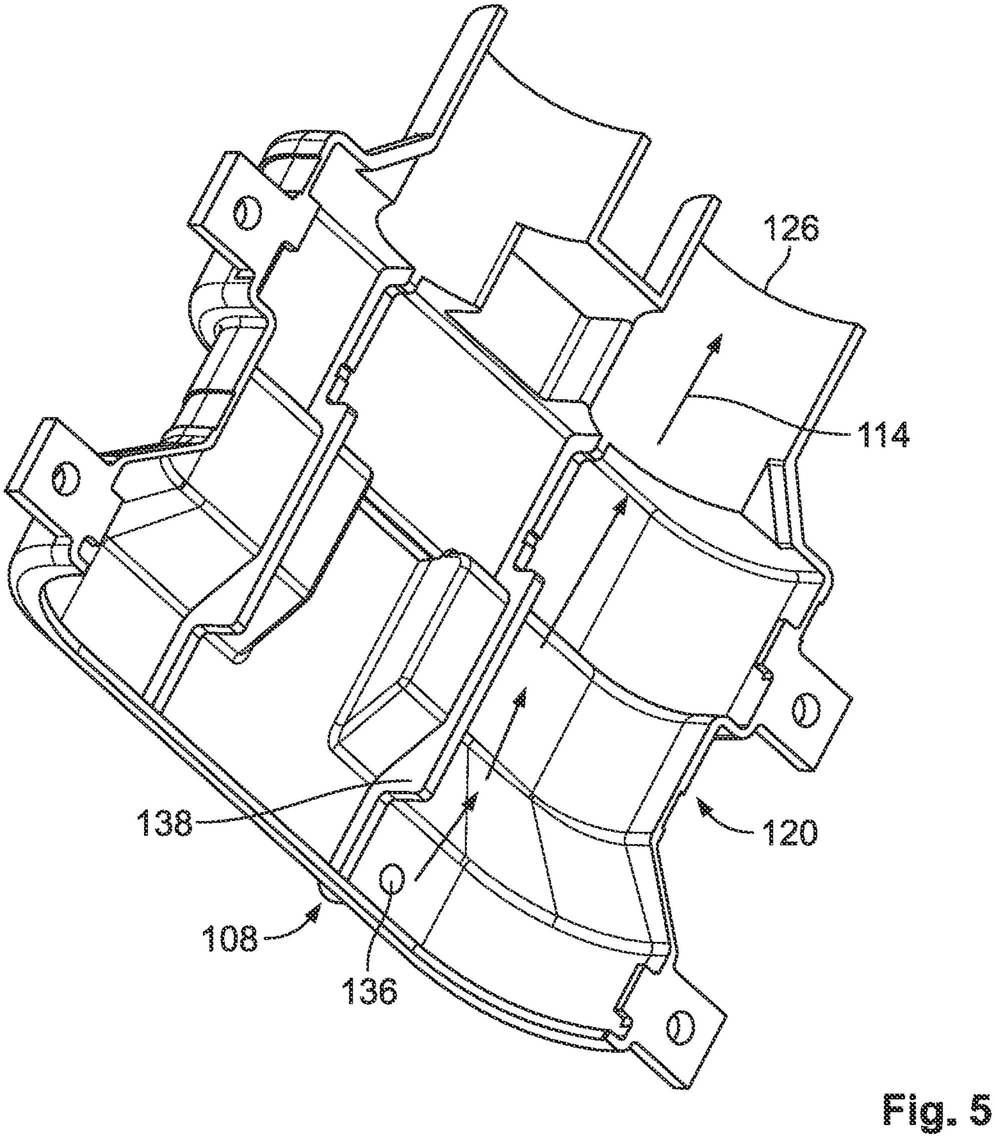
FIG. 5 is a perspective view of a cooling shell of a cooling fluid guidance housing.

FIG. 5 shows a schematic perspective illustration of a lower shell 120 of cooling fluid guidance housing 106. As shown schematically in FIG. 5 by arrows 114, the cooling channel opens in the interior of cooling fluid guidance housing 106, starting out from inlet opening 136 in the region of cooling fluid connection 108 along the inner wall of lower shell 120 of cooling fluid guidance housing 106. The cooling channel is there defined by the inner wall of lower shell 120 and the outer wall of connector housing 110, so that cooling fluid 114 flows along the outer wall of connector housing 110 through the cooling channel to outlet opening 126. The inner wall of lower shell 120 is shaped such that it follows the shape of the outer wall of connector housing 110. In an embodiment, the cooling channel is permeable to gas at a point along the inner wall of the cooling fluid guidance housing 106 apart from the inlet or channel opening 136.

Cooling fluid guidance walls 138, as shown in FIGS. 4 and 5, which additionally guide the flow of fluid within cooling fluid guidance housing 106, can be attached to lower shell 120 of cooling fluid guidance housing 106. Cooling fluid guidance walls 138 can there be formed integrally with cooling fluid guidance housing 106. Cooling fluid guidance walls 138 serve, firstly, to guide cooling fluid 114 as efficiently as possible in the direction of heat sources or hotspots that arise within connector housing 110. The heat source can be the point of contact in the electrical connector system 100 or any other hotspots determined by simulation outcomes that arise when current flows through the electrical connector system 100.

Secondly, cooling fluid guidance walls 138 can also serve as partition walls which separate several individual cooling channels from one another. The individual cooling channels can be symmetrically shaped, but can also have different configurations, for example, a predefined distance between the inner wall of cooling fluid guidance housing 106 and the outer wall of connector housing 110 can vary among the different cooling channels.

A configuration of upper shell 118 can analogous to the configuration of lower shell 120.

The resulting cooling channel or channels enables a cooling fluid to be guided around the outside of the connector housing 110 so that the cooling fluid does not need to be passed through the interior of the connector housing 110, where this can lead to contamination and therefore to damage to the electrical lines or contact elements.

Figure 6:
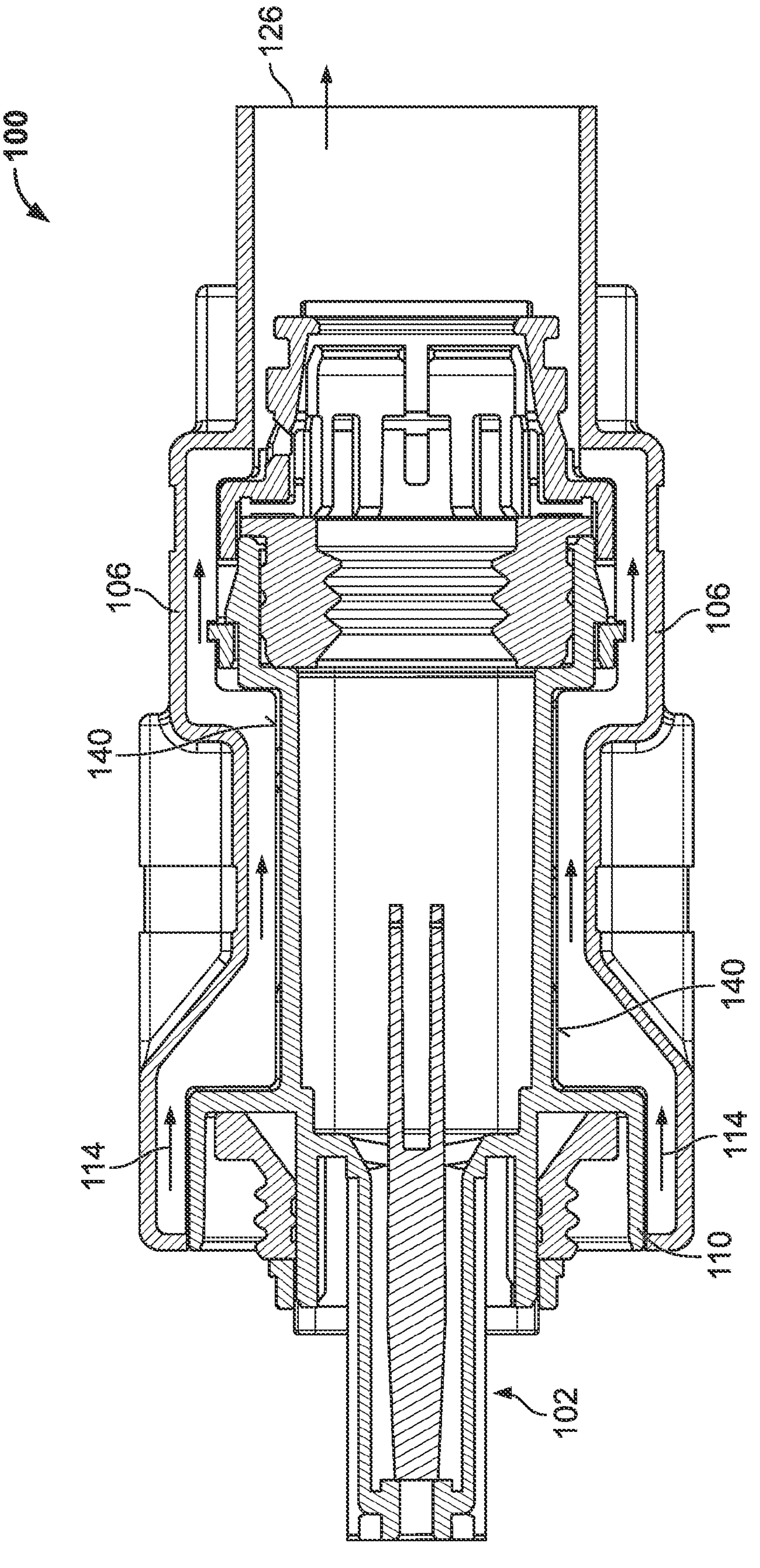
FIG. 6 is a sectional side view of the electrical connector system.

FIG. 6 shows a schematic sectional illustration of connector 102 which is surrounded by the cooling fluid guidance housing 106. As shown schematically in the figure by arrows, cooling fluid 114 can flow through a cooling fluid connection 108 into a cooling channel which is defined by the inner wall of cooling fluid guidance housing 106. The cooling fluid there flows along an outer wall 140 of connector housing 110 so that one or more heat sources within the connector housing 110 can be cooled by the heat being transported away. The heat is transported from a heat source out from the interior of connector 102 first through connector housing 110 to outer wall 140 of connector housing 110, around which cooling fluid 114 flows on the outside. The cooling fluid there cools outer wall 140 of connector housing 110 and therefore indirectly also the heat source within connector 102, and thereby absorbs the heat transported through connector housing 110. In an embodiment, the outer wall 140 of the connector housing 110 has a fluid guidance element defining the cooling channel.

The heated cooling fluid can then exit the cooling channel through outlet opening 126 and be transported away from the cooling fluid guidance housing 106. Even if the predominant direction of flow is presently shown in the axial direction in the direction of outlet opening 126 in FIG. 6, cooling fluid 114 can certainly also flow around the outer wall 140 in the radial direction. Air guide walls, which can be attached both to the inner wall of cooling fluid guidance housing 106 as well as optionally to the outer wall of connector housing 110, can therefore extend both in the axial direction as well as in the radial direction around connector housing 110.

As shown in FIG. 6, a ruling section or an effective volume of the cooling channel for fluid transport can be determined largely by the predefined distance between outer wall 140 of connector housing 110 and the inner wall of cooling fluid guidance housing 106. In an embodiment, the distance between outer wall 140 of connector housing 110 and the inner wall of cooling fluid guidance housing 106 is reduced in a region in which cooling fluid 114 flows around connector housing 110 around a heat source ("hotspot") in order to increase the flow rate and therefore the efficiency of cooling the cooling fluid in the region of the hotspot. As mentioned above, such a heat source can arise, for example, in the region of the point of contact when current flows through the contact elements of the connector 102 and the mating connector 104.

Even if only one embodiment has been shown so far in which cooling fluid guidance housing 106 surrounds at least in part connector 102, cooling fluid guidance housing 106 can of course also surround at least in part mating connector 104 so that a cooling fluid for cooling can flow through cooling fluid guidance housing 106 at the outside around mating connector housing 110. Furthermore, connector 102 as well as mating connector 104 can each be equipped with a separate cooling fluid guidance housing 106. Once both connectors 102 and 104 have been plugged into one another, the two separate cooling fluid duct housings can there each form a common higher-level cooling fluid guidance housing with shared cooling channels, so that connectors 102 and 104 can be cooled together. Alternatively, the cooling channels formed in two separate cooling fluid guidance housings 106 can also remain separated from one another after both two connectors 102 and 104 have been plugged into one another so that each of connectors 102 and 104 is cooled separately.

The present invention further relates to a method for installing the electrical connector system 100 with the cooling fluid guidance housing 106 for guiding a cooling fluid around the electrical connector system 100, the method comprising the following steps: providing the electrical connector system 100 comprising the connector 102 and the mating connector 104, attaching the cooling fluid guidance housing 106, where the cooling fluid guidance housing 106 is made to contact the connector housing 110 of the connector 102 in a first section in which at least one support element 130 is arranged, an inner wall of the cooling fluid guidance housing 106 in a second section follows an outer wall of the connector housing 110 at a predefined distance, where the inner wall of the cooling fluid guidance housing 106 in the second section defines at least one cooling channel which surrounds at least in part the outer wall of the connector housing 110, and the cooling fluid guidance housing 106 comprises at least one external cooling fluid connection 108 by way of which the cooling fluid can be introduced into the at least one cooling channel.

Figure 7:
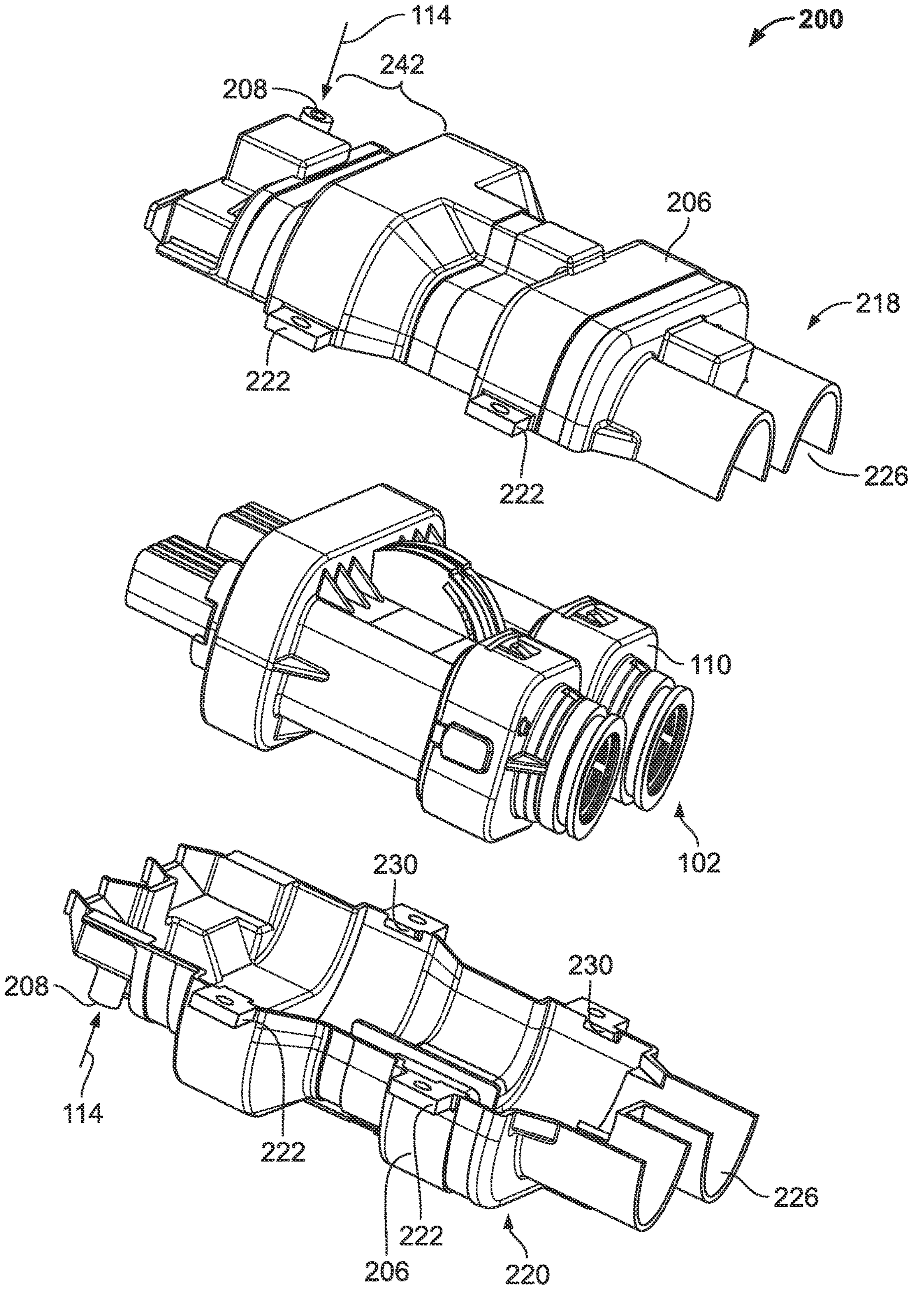
FIG. 7 is an exploded perspective view of an electrical connector system according to another embodiment.
Figure 8:
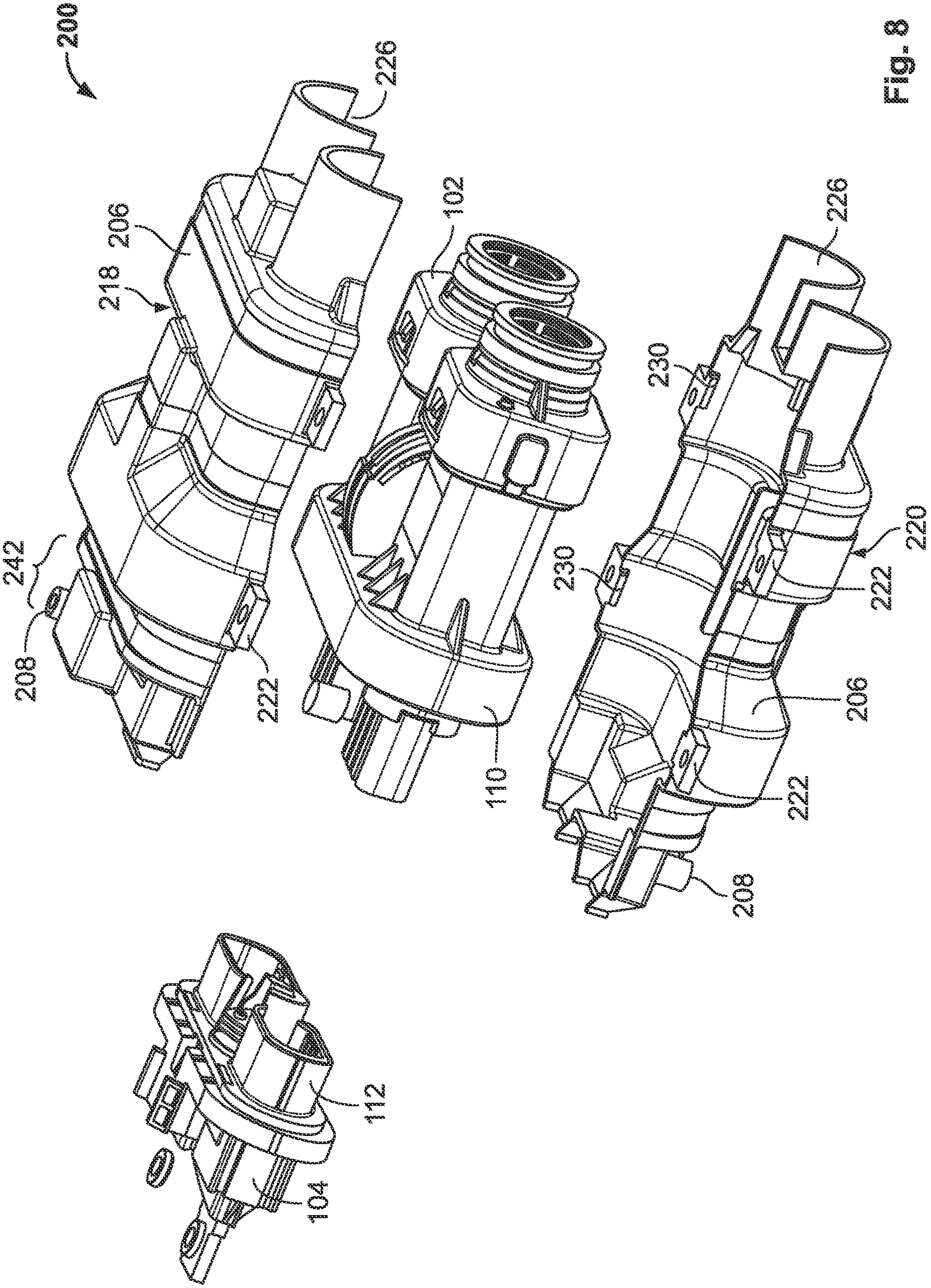
FIG. 8 is another exploded perspective view of the electrical connector system of FIG. 7.
Figure 9:
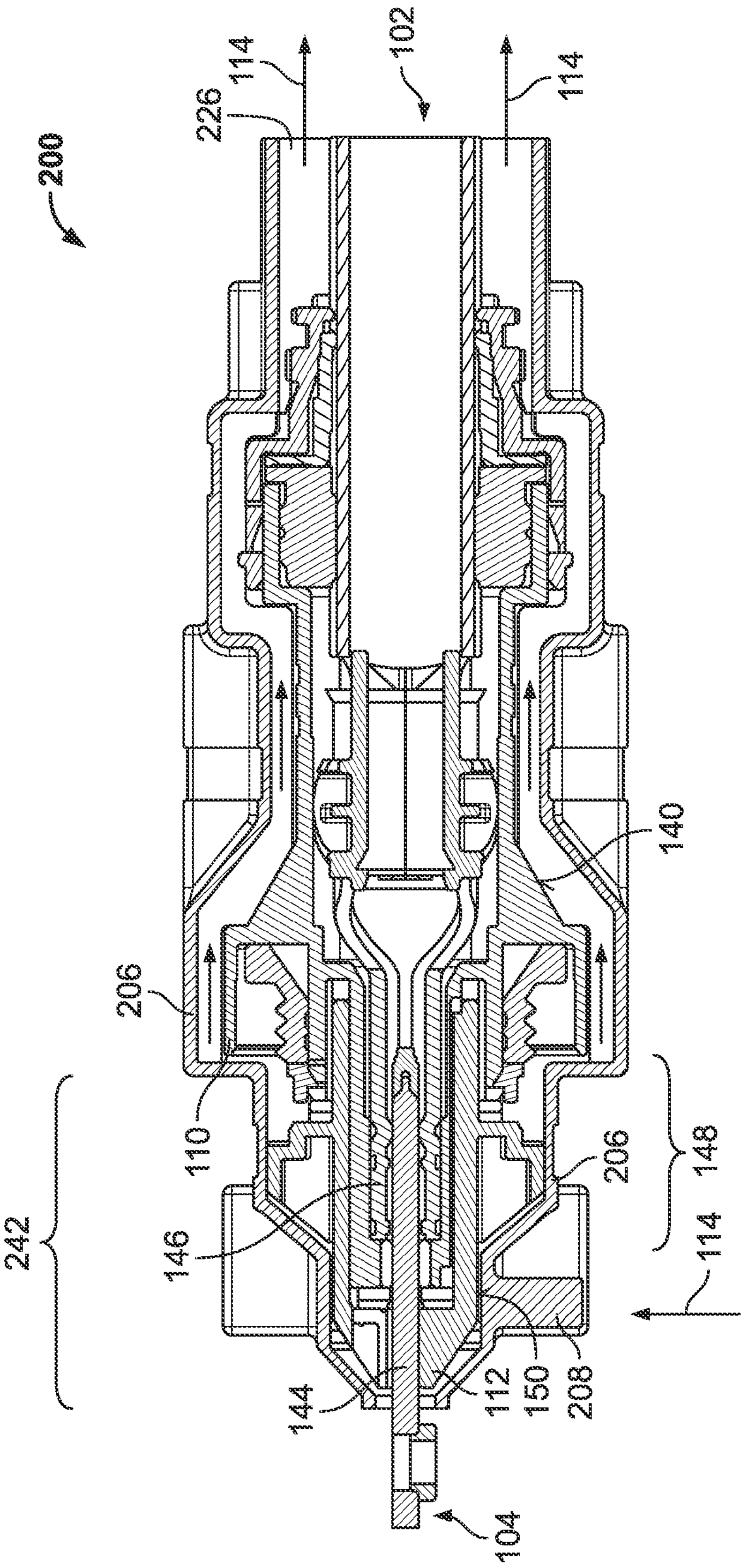
FIG. 9 is a sectional side view of the electrical connector system of FIG. 7.

FIGS. 7 and 8 each show a schematic exploded illustration of electrical connector system 200 according to a second embodiment. FIG. 7 shows electrical connector system 200 without mating connector 204 and FIG. 8 shows electrical connector system 200 with mating connector 204. FIG. 9 shows a corresponding schematic sectional illustration through electrical connector system 200 according to the second embodiment. All aspects and advantages that were described for the first embodiment also apply to the second embodiment. The second embodiment differs from the first embodiment only in that cooling fluid guidance housing 206 comprises a receiving section 242 (third section) in which the cooling fluid guidance housing 206 can receive mating connector 104.

After reception of mating connector 104, cooling fluid guidance housing 206, formed by an upper shell 218 and a lower shell 220 in FIGS. 7 and 8 by way of example, defines a cooling channel which surrounds at least in part an outer wall of mating connector housing 112. This cooling channel can be in fluid communication with the cooling channel which surrounds the outer wall of connector housing 110. In this way, the mating connector housing 112 can also be cooled in addition to the connector housing 110, so that cooling efficiency can be further increased. Both cooling channels, however, can also be formed separately in embodiments.

A cooling fluid connection 208 can then be attached to cooling fluid guidance housing 206, for example, in the region of receiving section 242 so that cooling fluid 114 first flows around the outer wall of mating connector housing 112 after entering the cooling fluid guidance housing. Cooling fluid 114 is then guided through the cooling channel on the outside along the outer wall of connector housing 110 until it can exit cooling fluid guidance housing 206 again at one or more outlet openings 226 and can transport away heat that has been absorbed. Outlet opening 226 can again be formed, for example, by an opening in the region of the connections of an electrical cable or an electrical device, such as an electrical unit, so that heat can be transported away efficiently from the point of contact between connector 102 and mating connector 104.

Of course, cooling fluid connection 208 and outlet opening 226 can also be attached such that the cooling channel surrounds connector housing 110 upstream and surrounds mating connector housing 112 downstream.

As is shown schematically in FIG. 8, electrical connector system 200 comprising connector 102 and mating connector 104 can first be closed for mounting the assembly. Cooling fluid guidance housing 206 can thereafter be made to contact connector housing 110 or mating connector housing 112 (or both) by support elements 230, so that the cooling fluid guidance housing 206 can be attached in a stable manner to electrical connector system 200. Upper shell 218 and lower shell 220 can then be fastened to one another in a closed manner with the aid of fastening elements 222.

Alternatively, cooling fluid guidance housing 206 can also be formed integrally and already be mounted on connector 102 (or mating connector 104) before electrical connector system 200 is closed, so that mating connector 104 (or connector 102) is received in cooling fluid guidance housing 206 when electrical connector system 200 is closed.

In the example of FIG. 9, mating connector 104 comprises an electrically conductive pin-shaped contact unit 144 which extends into socket-shaped base body 146 of connector 102. In the plugged-in state, which is presently shown, electrical current can flow via a contact section 148. The heat generated in contact section 148 can be transported away by cooling fluid 114, which, as shown in FIG. 9 by arrows, flows around an outer wall 150 of mating connector housing 112 and an outer wall 140 of connector housing 110. The cooling channel through which the cooling fluid flows is there defined by the inner wall of cooling fluid guidance housing 206 and is guided thereby along outer wall 150 of mating connector housing 112 and an outer wall 140 of connector housing 110. In addition to outlet opening 226, further venting openings can be provided on cooling fluid guidance housing 206, for example, in the region of the connections for an electrical cable or an electrical device on mating connector 104.

Furthermore, all cross-sectional diameters or cross-sectional dimensions of the cooling channel are to be selected such that the respective sections of the cooling channel (branches, throttling points, etc.) can have cooling fluid 114 flow therethrough as desired. In particular, the distance between the inner wall of cooling fluid guidance housing 206 and the outer wall of connector housing 110 or mating connector housing 112 is to be selected such that flow rates realizable in the respective sections with acceptable fluid pressures and fluid temperatures not to be exceeded, realizable flow resistances and a realizable cooling volume for the cooling fluid flowing around electrical connector system 200 prevail.

The present invention achieves active cooling with minimal additional space requirements by providing the separate cooling fluid guidance housing 106 through which the cooling fluid can flow and which can be attached to the electrical connector system 100. The cooling fluid guidance housing 106 conducts a cooling fluid in an advantageous manner on the exterior along the outer wall of the connector housing 110 in the vicinity of the point of contact (also referred to as a hotspot herein), absorbs the heat generated in the electrical connector system 100 by the electrical connection and transferred to the connector housing 110, and transports it along the outer wall of the connector housing 110 to a respective heat sink. As a result, particularly efficient heat management and consequently efficient energy transfer can be obtained.

In an embodiment, the electrical connector system 100 comprises in particular no field control member, no grounding device, no capacitive divider, no capacitive test point, no sealing plug, no protection for e.g. an underground, in particular buried, place of use, no UV protection, and/or no seizure protection. Furthermore, a contact element of the connector 102, in an embodiment, does not have a thread. A vehicle can be understood to be a land vehicle (road vehicle, off-road vehicle, and/or rail vehicle), a watercraft (displacer and/or glider), and/or an aircraft (propeller-driven aircraft, jet aircraft, helicopter, and/or airship).

What is claimed is:

1. An electrical connector system, comprising:

a connector having a connector housing;

a mating connector; and a cooling fluid guidance housing including a first section in which a support element is arranged, the support element contacts the connector housing, a second section in which an inner wall of the cooling fluid guidance housing follows an outer wall of the connector housing at a predefined distance with the connector received in the cooling fluid guidance housing, the inner wall of the cooling fluid guidance housing in the second section defines a cooling channel surrounding at least in part the outer wall of the connector housing, and a cooling fluid connection by which a cooling fluid is introduced into the cooling channel.

2. The electrical connector system of claim 1, wherein the cooling fluid connection is a connection port, a connection flange, or a connection socket.

3. The electrical connector system of claim 1, wherein the cooling fluid guidance housing has a cooling fluid guidance wall defining a part of the cooling channel.

4. The electrical connector system of claim 1, wherein the cooling channel, starting from the cooling fluid connection, opens outwardly along the outer wall of the connector housing through a channel opening for exit of the cooling fluid.

5. The electrical connector system of claim 4, wherein the cooling channel is permeable to gas at a point along the inner wall of the cooling fluid guidance housing apart from the channel opening.

6. The electrical connector system of claim 1, wherein the cooling channel extends along the outer wall of the connector housing in a direction of a heat source within the connector housing.

7. The electrical connector system of claim 1, wherein the cooling fluid guidance housing has a second cooling fluid connection transporting the cooling fluid.

8. The electrical connector system of claim 1, wherein the predefined distance in the second section between the inner wall of the cooling fluid guidance housing and the outer wall of the connector housing differs between an inlet section and an outlet section of the cooling channel.

9. The electrical connector system of claim 1, wherein the cooling fluid guidance housing in a direction of a contact element access for the mating connector terminates flush with the outer wall of the connector housing.

10. The electrical connector system of claim 1, wherein the cooling fluid guidance housing receives the mating connector.

11. The electrical connector system of claim 1, wherein the inner wall of the cooling fluid guidance housing in the second section forms a plurality of separate cooling channels with the outer wall of the connector housing.

12. The electrical connector system of claim 1, wherein the outer wall of the connector housing has a fluid guidance element defining the cooling channel.

13. The electrical connector system of claim 1, wherein the cooling fluid guidance housing has a third section in which the inner wall of the cooling fluid guidance housing follows an outer wall of a mating connector housing of the mating connector at a predefined distance.

14. The electrical connector system of claim 13, wherein the inner wall of the cooling fluid guidance housing in the third section defines the cooling channel that at least in part surrounds the outer wall of the mating connector housing.

15. The electrical connector system of claim 1, wherein the cooling fluid guidance housing has a plurality of cooling shells.

16. The electrical connector system of claim 15, wherein each of the cooling shells has a fastening element fastening the cooling shell to one of the other cooling shells.

17. A method for installing an electrical connector system with a cooling fluid guidance housing for guiding a cooling fluid around the electrical connector system, comprising:

providing the electrical connector system including a connector and a mating connector;

attaching the cooling fluid guidance housing to the electrical connector system, the cooling fluid guidance housing having a first section with a support element contacting a connector housing of the connector and a second section in which an inner wall of the cooling fluid guidance housing follows an outer wall of the connector housing at a predefined distance, the inner wall of the cooling fluid guidance housing in the second section defines a cooling channel surrounding at least in part the outer wall of the connector housing; and introducing the cooling fluid into the cooling channel through a cooling fluid connection of the cooling fluid guidance housing.

18. The method of claim 17, wherein the inner wall of the cooling fluid guidance housing in a third section follows an outer wall of a mating connector housing of the mating connector at a predefined distance.

19. The method of claim 18, wherein the inner wall of the cooling fluid guidance housing in the third section defines the cooling channel that at least in part surrounds the outer wall of the mating connector housing.

* * * * *